(12) United States Patent
Ingram, Jr. et al.

(10) Patent No.: US 10,040,221 B2
(45) Date of Patent: Aug. 7, 2018

(54) ELONGATED ELASTOMERIC PARTS AND MANDRELS FOR FACILITATING REMOVAL OF ELONGATED ELASTOMERIC PARTS FORMED THEREON

(71) Applicant: The Boeing Company, Chicago, IL (US)

(72) Inventors: William H. Ingram, Jr., Seattle, WA (US); Jesse M. Havens, Asheboro, NC (US); Megan Elizabeth Bliss, SeaTac, WA (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 14/885,504

(22) Filed: Oct. 16, 2015

(65) Prior Publication Data

US 2017/0106569 A1 Apr. 20, 2017

(51) Int. Cl.
*B29C 49/00* (2006.01)
*B29C 33/46* (2006.01)
*B29C 33/76* (2006.01)
*B29C 41/40* (2006.01)
*B29C 70/06* (2006.01)
*B29C 35/02* (2006.01)
*B29K 19/00* (2006.01)
*B29L 23/00* (2006.01)

(52) U.S. Cl.
CPC .............. *B29C 33/46* (2013.01); *B29C 33/76* (2013.01); *B29C 41/40* (2013.01); *B29C 70/06* (2013.01); *B29C 35/02* (2013.01); *B29K 2019/00* (2013.01); *B29L 2023/00* (2013.01)

(58) Field of Classification Search
CPC ......... B29C 33/46; B29C 33/76; B29C 70/06; B29C 41/40; B29C 35/02; B29L 2023/00; B29K 2019/00
See application file for complete search history.

(56) References Cited

U.S. PATENT DOCUMENTS

| | | | |
|---|---|---|---|
| 2,361,026 A | 8/1942 | Greene | |
| 2,895,867 A * | 7/1959 | Fourmanoit | ......... B28B 21/905 162/118 |
| 3,021,245 A * | 2/1962 | Roberts | .................. B29D 23/18 138/122 |
| 7,527,222 B2 | 5/2009 | Biornstad et al. | |
| 2014/0103585 A1 | 4/2014 | Coxon et al. | |

* cited by examiner

*Primary Examiner* — Galen H Hauth
(74) *Attorney, Agent, or Firm* — Miller, Matthias & Hull LLP (57) ABSTRACT

A mandrel configured to facilitate release of an elastomeric part cured thereon may comprise an elongated body having an outer surface, an internal cavity formed in the elongated body, and a passage providing fluid communication between the internal cavity and the outer surface of the body. The passage may be dimensioned so as to permit a flow of a fluid from the internal cavity to the outer surface of the body and to preclude a flow of an uncured elastomer into the passage. The flow of the fluid from the internal cavity to the outer surface may cause the fluid to intervene between the outer surface of the mandrel and the elastomeric part to facilitate the release of the elastomeric part from the mandrel.

18 Claims, 10 Drawing Sheets

ELONGATED ELASTOMERIC PARTS AND MANDRELS FOR FACILITATING REMOVAL OF ELONGATED ELASTOMERIC PARTS FORMED THEREON

FIELD

The present disclosure generally relates to methods of fabricating elongated elastomeric parts, and more specifically, to mandrels for molding elongated elastomeric parts that are configured to facilitate the removal of the elongated elastomeric parts formed thereon.

BACKGROUND

Elastomeric (e.g., rubber, etc.) parts may be fabricated by molding the part over a mandrel. However, it may be difficult to remove an elastomeric part from the mandrel after molding due to vacuum, frictional, and constrictive forces which cause the part to cling to the mandrel, particularly when such elastomeric parts are elongated, thin-walled, and reinforced.

SUMMARY

In accordance with one aspect of the present disclosure, a method of forming an elastomeric part is disclosed. The method may comprise disposing an uncured elastomer on a mandrel, wherein the mandrel includes an elongated body with an internal cavity and a passage providing fluid communication between the internal cavity and an outer surface of the elongated body. The passage may be dimensioned to permit a flow of a fluid from the internal cavity to the outer surface of the elongated body but preclude a flow of uncured elastomer through the passage. The method may further comprise curing the uncured elastomer disposed on the mandrel to provide the elastomeric part, and flowing the fluid through the internal cavity to cause the fluid to flow out of the passage and intervene between the outer surface of the mandrel and the elastomeric part to facilitate release of the elastomeric part from the mandrel.

In accordance with another aspect of the present disclosure, a mandrel configured to facilitate release of an elastomeric part cured thereon is disclosed. The mandrel may comprise an elongated body having an outer surface and an internal cavity formed therein. The mandrel may further comprise a passage providing fluid communication between the internal cavity and the outer surface of the body. The passage may be dimensioned so as to permit a flow of a fluid from the internal cavity to the outer surface of the body but to preclude a flow of an uncured elastomer into the passage. The flow of the fluid from the internal cavity to the outer surface may cause the fluid to intervene between the outer surface of the mandrel and the elastomeric part to facilitate the release of the elastomeric part from the mandrel.

In accordance with another aspect of the present disclosure, a mandrel configured to facilitate release of an elastomeric part cured thereon is disclosed. The mandrel may comprise an elongated body having an outer surface, and a channel extending lengthwise along the outer surface of the elongated body and having a T-shape in cross-section. The channel may include both a wide region and a narrow region extending deeper into the mandrel than the wide region. The mandrel may further comprise an extrusion fit into the wide region such that the narrow region defines an internal cavity extending lengthwise through the mandrel. The extrusion may seal the channel except to permit fluid flow between the internal cavity and the outer surface of the mandrel. The fluid flow from the internal cavity to the outer surface of the mandrel may facilitate the release of the elastomeric part from the mandrel.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figures 1, 2:
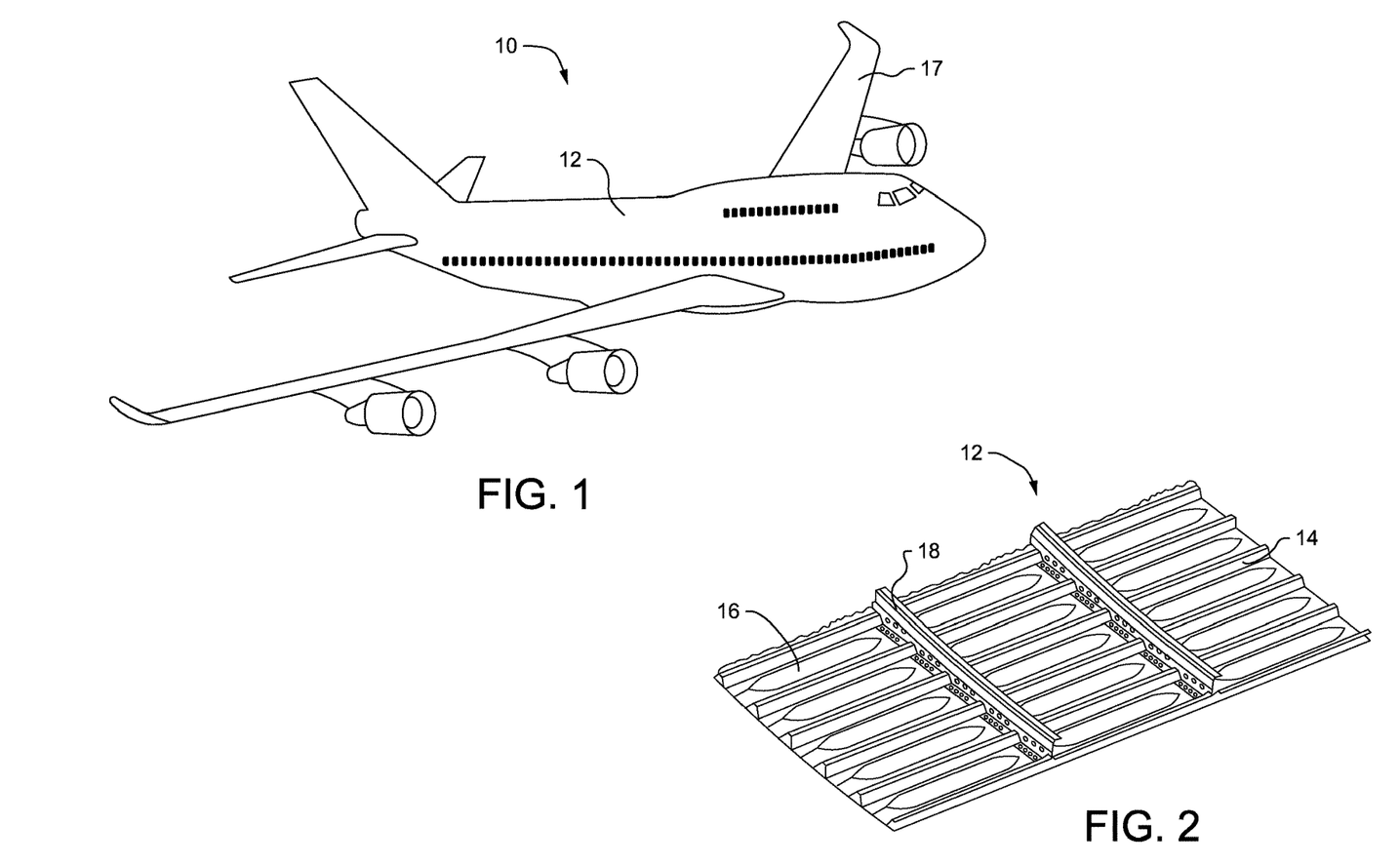
FIG. 1 is an isometric view of an aircraft, constructed in accordance with the present disclosure.
FIG. 2 is an isometric view of a portion of a fuselage of the aircraft having stringers, constructed in accordance with the present disclosure.

Referring now to the drawings, and with specific reference to FIGS. 1 and 2, an aircraft 10 is shown. The aircraft 10 may have a fuselage 12 and stringers 14 extending through the fuselage 12. As will be understood by those with ordinary skill in the art, the stringers 14 may act as stiffeners and may transfer aerodynamic loads between a skin 16 and frames 18 of the fuselage 12. However, the stringers 14 may be used in other regions of the aircraft as well, such as the wings 17. The stringers 14 and the skin 16 may be formed from composite materials such as, but not limited to, carbon fiber composite materials and graphite-epoxy composite materials.

Figure 3:
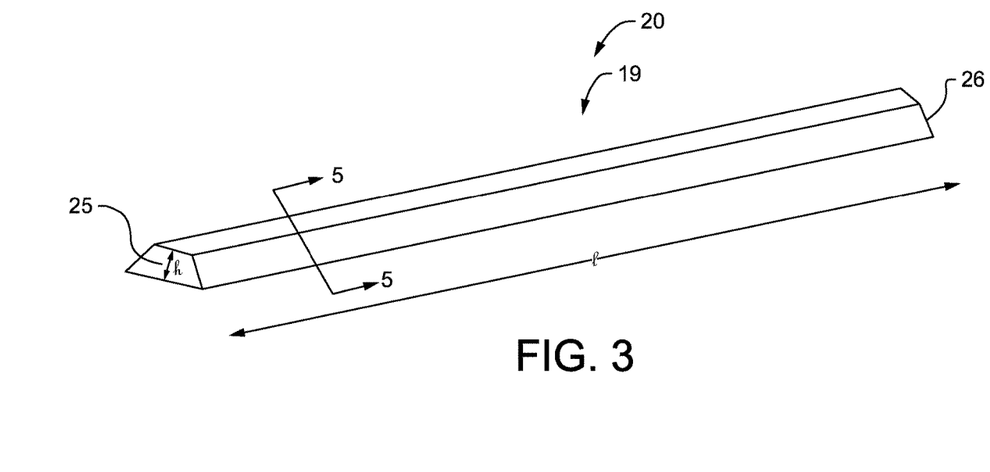
FIG. 3 is an isometric view of an elastomeric part or tool that may be used in the manufacture of the fuselage, constructed in accordance with the present disclosure.
Figure 4:
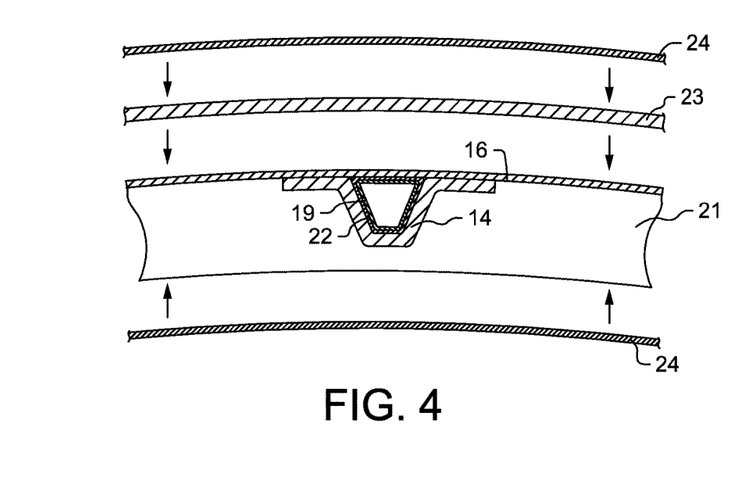
FIG. 4 is a cross-sectional schematic representation illustrating a use of the elastomeric tool in the manufacture of the fuselage, in accordance with the present disclosure.

An elongated elastomeric part 20 in accordance with the present disclosure is shown in FIG. 3. As a non-limiting possibility, the elongated elastomeric part 20 may be an elastomeric tool 19 used as part of the vacuum bagging scheme to form the fuselage stringers 14. For example, as shown in FIG. 4, an uncured stringer 14 may be placed in a hard tool 21, and the elastomeric tool 19 supporting a fabric (or tape) 22 may be positioned inside the stringer 14 so that the fabric 22 contacts an interior surface of the stringer 14. A composite material may then be placed over the hard tool 21 and in contact with the stringer 14 to provide the skin 16. In addition, a compressible pad 23 may be placed over the skin 16, and a vacuum bag 24 may be positioned around the compressible pad 23 and the hard tool 21 to allow evacuation of the space between elastomeric tool 19 and the vacuum bag 24 and the co-curing of the composite materials of the stringer 14 and the skin 16 upon application of heat and pressure. Following curing, the vacuum bag 24, the compressible pad 23, the hard tool 21, and the elastomeric tool 19 may be removed from the cured stringer and skin.

The above is just but one possible use of the elastomeric part 20 as described herein. The elastomeric part 20 may also be any type of elastomeric part that is thin-walled and elongated such that the longitudinal length (l) to transverse height (h) ratio of the part is much greater than one (l/h>>1). As a non-limiting example, if the elastomeric part 20 is used in the manufacture of the fuselage 12 as described above, it may have a longitudinal length (l) of at least ten feet or more, a transverse height (h) (or cross-sectional height) of between about one inch and about three inches, and a wall thickness of between about 0.05 inches and about 0.20 inches. For example, the elastomeric part 20 may have a longitudinal length of about 35 feet and a transverse height of about two inches. In addition, if the elastomeric part 20 is the elastomeric tool 19 used in the manufacture of the fuselage 12, it may have an open end 25, a closed end 26, and a trapezoidal shape that extends along the longitudinal length of the part from the open end 25 to the closed end 26, as shown. However, it will be understood that alternative elongated and tube-like shapes of the elastomeric part are also encompassed within the scope of the present disclosure.

Figure 5:
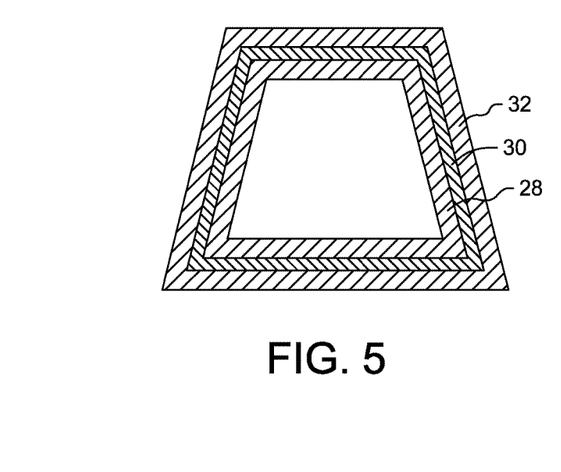
FIG. 5 is a cross-sectional view through the section 5-5 of FIG. 3, constructed in accordance with one aspect of the present disclosure.

The elastomeric part 20 may be formed from one or more rubber-like elastomeric materials. As used herein, an elastomeric material is a polymeric material that has viscoelastic (viscous and elastic) properties. For example, the elastomeric part 20 may be formed, at least in part, from a fluoropolymer elastomer such as, but not limited to, Viton® fluoroelastomer. Alternatively, it may be formed from other types of polymers such as, but not limited to, silicone, polyester, and urethane. In addition, the elastomeric part 20 may optionally be reinforced with a reinforcement material such as, but not limited to, fiberglass, carbon fiber, metal fibers, or polymer fibers. FIG. 5 depicts one possible material construction of the elastomeric part 20 that includes a first fluoropolymer elastomer layer 28, a fiberglass layer 30 surrounding the first fluoropolymer elastomer layer 28, and a second fluoropolymer elastomer layer 32 surrounding the fiberglass layer 30. Various alternative elastomeric material or elastomeric material/reinforcing material arrangements are also encompassed within the scope of the present disclosure.

Figure 6:
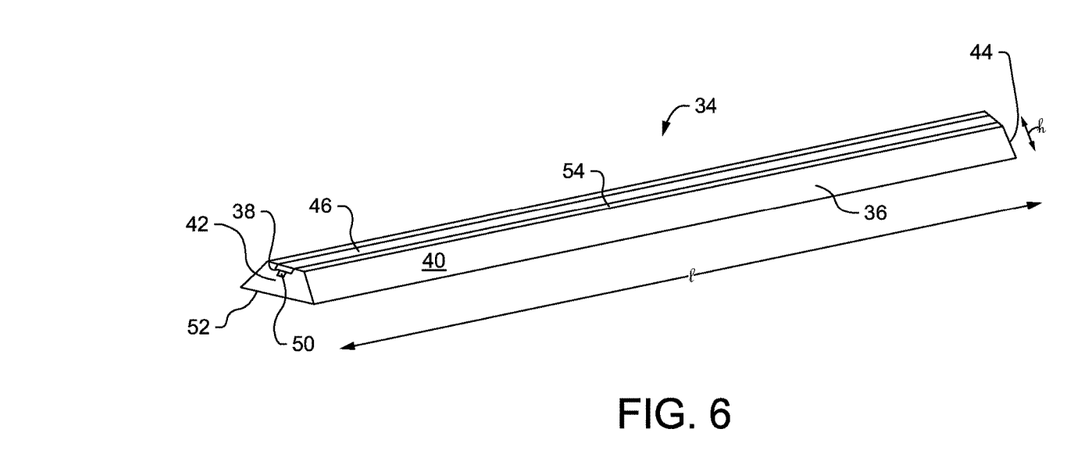
FIG. 6 is an isometric view of a mandrel that may be used in the fabrication of the elastomeric part, constructed in accordance with the present disclosure.

A mandrel 34 that may be used to mold the elastomeric part 20 is shown in FIG. 6. The mandrel 34 may have an elongated body 36 as well as a channel 38 formed in one or more outer surfaces 40 of the mandrel 34 (also see FIG. 12), with the channel 38 extending lengthwise across a longitudinal length (l) of the mandrel 34 from a first end 42 to a second end 44. An extrusion 46 may be engaged with a portion of the channel 38 in an interference fit 48 (also see FIGS. 9-10 and further details below) to define a hollow internal cavity 50 extending lengthwise through the mandrel 34 from the first end 42 to the second end 44. As will be described in further detail below, the interference fit 48 between the extrusion 46 and the mandrel 34 may seal the channel 38 except to permit the flow of a fluid from the internal cavity 50 to the outer surface 40 of the mandrel 34 for facilitating release of the elastomeric part 20 from the mandrel 34.

Figure 7:
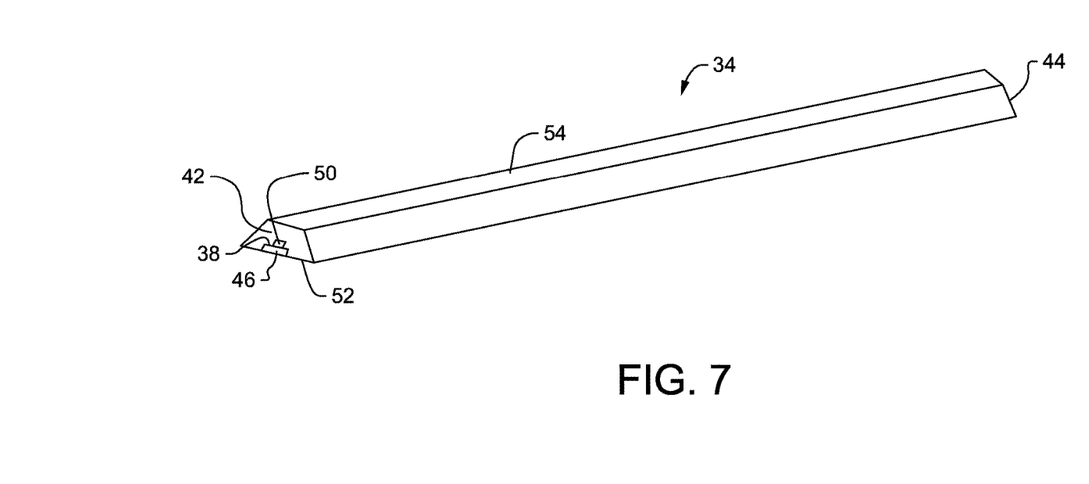
FIG. 7 is an isometric view of alternative mandrel that may be used in the fabrication of the elastomeric part, constructed in accordance with the present disclosure.

The mandrel 34 may have a shape suitable to mold the desired shape of the elastomeric part 20. For example, if the elastomeric part 20 is structured as described above and shown in FIG. 3, the elongated body 36 of the mandrel 34 may have a longitudinal length (l) (extending from the first end 42 to the second end 44) of at least ten feet or more, a transverse height (h) of between about one inch and about three inches, and a trapezoidal cross-sectional shape that extends along the longitudinal length of the mandrel 34. As a result of its trapezoidal cross-sectional shape, the mandrel 34 may have a wider base side 52 and a narrower cap side 54. The channel 38 and the extrusion 46 may be presented on the cap side 54 of the mandrel 34 (see FIG. 6), or on the base side 52 of the mandrel 34 (see FIG. 7). In other alternative arrangements, the mandrel 34 may have multiple channels and extrusions presented on one or more sides of the mandrel 34. It will be understood, however, that the structure of the mandrel 34 may vary in practice depending on the application and structure of the elastomeric part 20.

Figure 8:
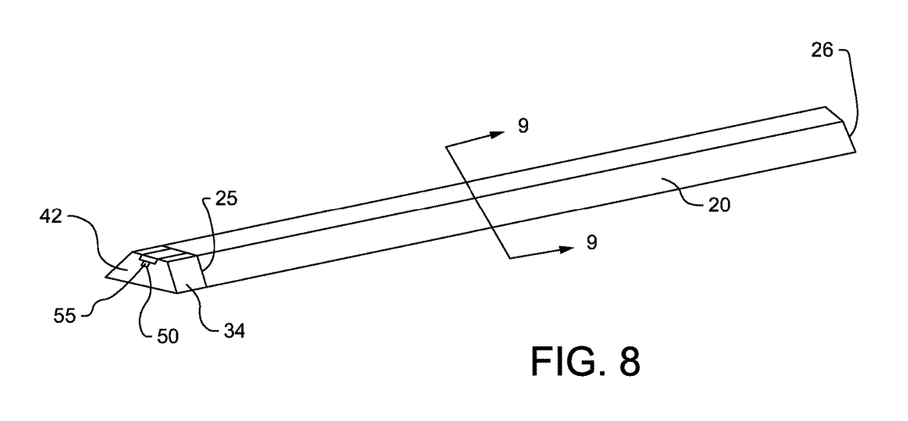
FIG. 8 is an isometric view of the mandrel of FIG. 6 having the elastomeric part formed thereon, constructed in accordance with the present disclosure.
Figure 9:
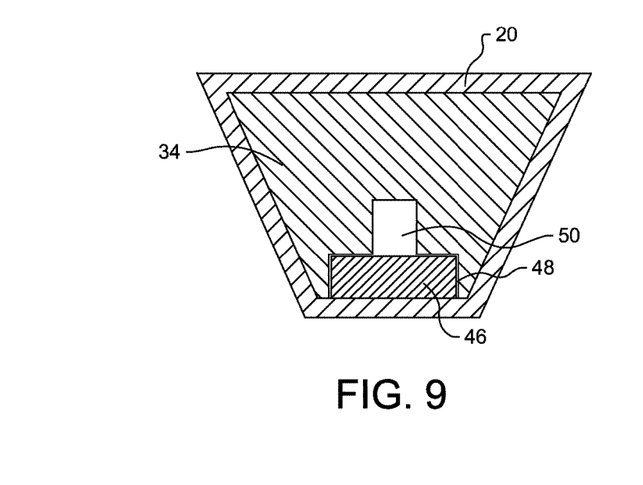
FIG. 9 is a cross-sectional view through the section 9-9 of FIG. 8, constructed in accordance with the present disclosure.

The elastomeric part 20 molded on the mandrel 34 is shown in FIGS. 8-9. After molding the elastomeric part 20 on the mandrel 34, the closed end 26 of the elastomeric part 20 may cover the second end 44 of the mandrel 34, while the first end 42 of the mandrel 34 may remain exposed to permit introduction of a fluid into an exposed end 55 of the internal cavity 50 when release of the elastomeric part 20 from the mandrel 34 is desired (see further details below). It is further noted here that the internal cavity 50 may, advantageously, at least partially release vacuum forces between the closed end 26 of the part 20 and the mandrel 34 to further assist in release of the part 20 from the mandrel 34.

Figure 10:
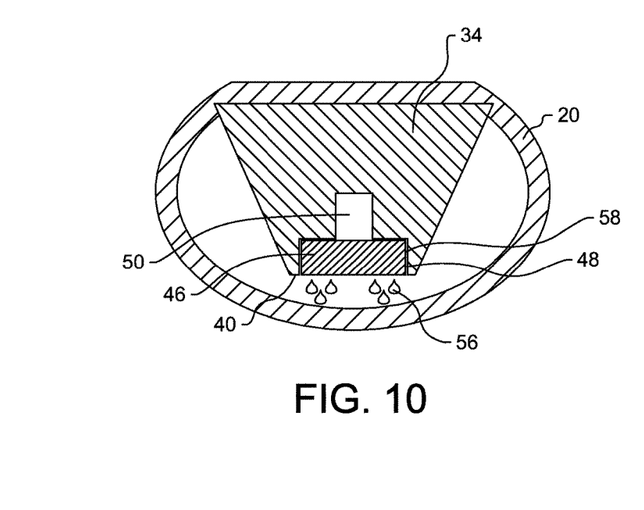
FIG. 10 is a cross-sectional view similar to FIG. 9, but with a fluid flowing through a passage of the mandrel to facilitate release of the elastomeric part from the mandrel, constructed in accordance with the present disclosure.

Referring now to FIGS. 9-10, the mechanism of release of the elastomeric part 20 from the mandrel 34 will now be described in further detail. Prior to introduction of a fluid into the internal cavity 50, various forces (frictional, constrictive, vacuum, etc.) between the elastomeric part 20 and the mandrel 34 may make it challenging to remove the part 20 from the mandrel 34, with the difficulty in removing the part 20 increasing as the part becomes increasingly thin, elongated, and/or reinforced with reinforcement material. To ease the release of the elastomeric part 20 from the mandrel, a fluid 56 may be pumped or otherwise introduced into the inner cavity 50 via the exposed end 55 of the cavity (also see FIG. 8). The interference fit 48 between the extrusion 46 and the mandrel 34 may permit the flow or leakage of the fluid 56 from the internal cavity 50 to the outer surface 40 of the mandrel 34, thereby causing the fluid 56 to intervene between the elastomeric part 20 and the outer surface 40. More specifically, the interference fit 48 between the extrusion 46 and the mandrel 34 may create a passage 58 that provides fluid communication between the internal cavity 50 and the outer surface 40. Advantageously, the passage 58 may be dimensioned to permit the flow of the fluid 56 from the internal cavity 50 to the outer surface 40 of the mandrel, and to preclude the flow of uncured elastomer through the passage 58. The latter property of the passage 58 may prevent uncured elastomer from flowing into the passage 58 and/or the internal cavity 50 prior to curing, thereby preserving the molding capability of the mandrel 34.

The fluid 56 that intervenes between the outer surface 40 of the mandrel and the elastomeric part 20 may eliminate vacuum build-up between the mandrel 34 and the part 20, provide lubrication between the mandrel 34 and the part 20, and cause the subtle inflation of the elastomeric part 20 to ease its release from the mandrel 34 (see FIG. 10, in which the inflation of the elastomeric part has been exaggerated for illustration purposes). The fluid 56 used to release the part 20 from the mandrel 34 may be a solution of soap and water, although other types of fluids such as air, water, oil, or other lubricating fluids or release agents may be used as well. When using soap water as the fluid 56, applicants have found that the passage 58 created by the interference fit 48 permits the flow of the fluid therethrough at fluid pressures as low as 30 pounds per square inch (psi).

Figure 11:
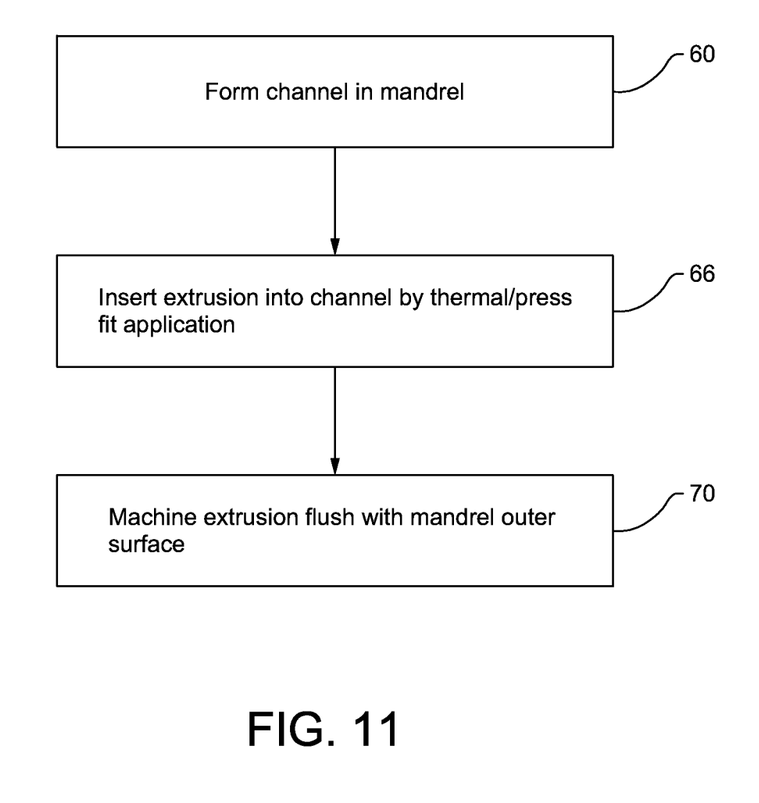
FIG. 11 is a flowchart illustrating a sample sequence of steps that may be involved in fabricating the mandrel, in accordance with a method of the present disclosure.
Figure 12:
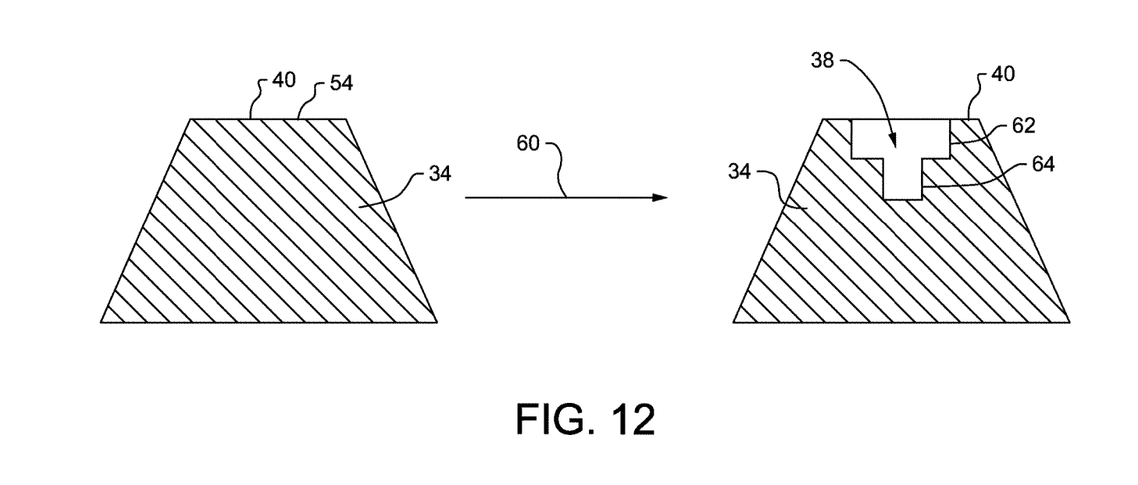
FIG. 12 is a cross-sectional view, schematically illustrating forming a channel in the mandrel, in accordance with the method of FIG. 11.
Figure 13:
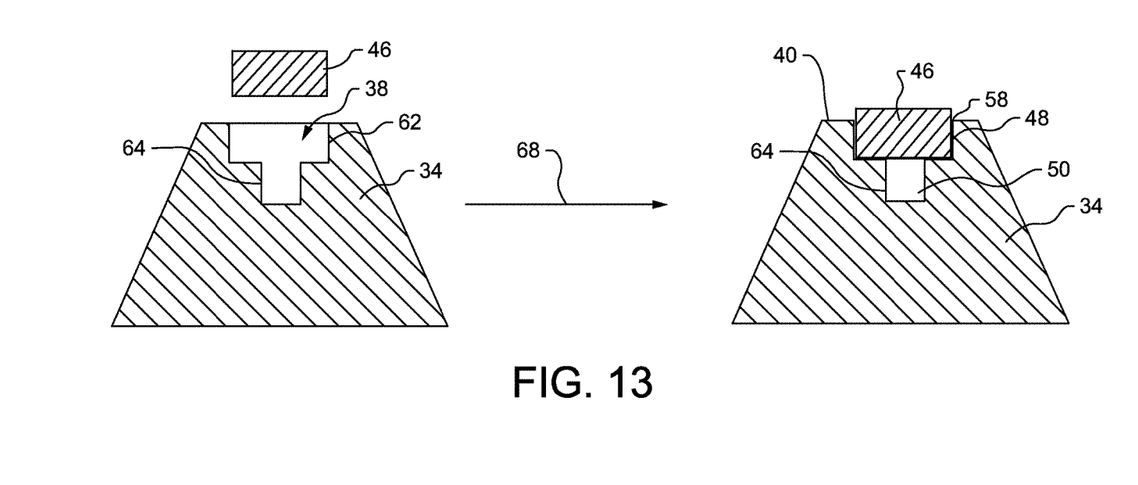
FIG. 13 is a cross-sectional view, schematically illustrating a thermal/press fit application of an extrusion into the channel, in accordance with the method of FIG. 11.
Figure 14:
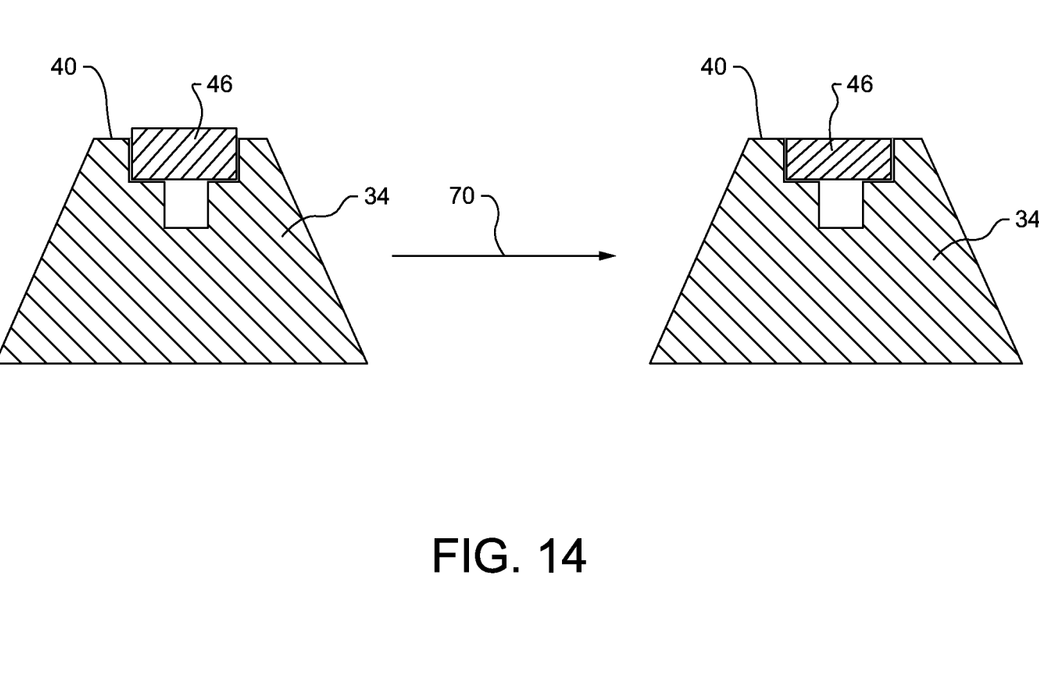
FIG. 14 is a cross-sectional view, schematically illustrating machining the extrusion flush with an outer surface of the mandrel, in accordance with the method of FIG. 11.

A series of steps that may be involved in fabricating the mandrel 34 are shown in FIG. 11. The steps are schematically illustrated in FIGS. 12-14. Beginning with a first block 60, the channel 38 may be formed in the outer surface 40 of the mandrel 34 using a suitable machining operation (see FIG. 12). The channel 38 may have a wide region 62 as well as a narrow region 64 that extends deeper into the mandrel than the wide region 62 such that the channel 38 has a T-shape in cross-section (see FIG. 12).

According to a next block 66, the extrusion 46 may be inserted into the channel 38 by a thermal/press fit application 68 to provide the interference fit 48 (see FIG. 13). The thermal/press fit application 68 of the extrusion 46 into the channel 38 may be carried out by first heating the mandrel 34 to cause the thermal expansion of the mandrel 34 (and the wide region 62), while maintaining the extrusion 46 at ambient temperature. The extrusion 46 (at ambient temperature) may then be press-fit into the wide region 62 while the mandrel is thermally expanded, and the mandrel 34 may be permitted to cool to allow the wide region 62 to thermally contract and retain the extrusion 46 in the mandrel 34 (see FIG. 13). For optimal achievement of the thermal/press fit application as described herein, the extrusion 46 and the mandrel 34 may be formed from materials having the same or about the same coefficients of thermal expansion. For example, the extrusion 46 and mandrel 34 may both be formed from 6000 series aluminum alloy, although other types of materials having matching coefficients of thermal expansion may also be used. When using an extrusion and a mandrel formed from 6000 series aluminum alloy, applicants have found that a temperature difference between the mandrel 34 and the extrusion 46 of between about 250° F. and about 300° F. is sufficient to provide the interference fit 48 having the properties disclosed herein.

Once the extrusion 46 is fit into the wide region 62 as described above, the interference fit 48 therebetween may define the passage 58. In addition, the narrow region 64 may define the internal cavity 50 as a hollow space extending lengthwise through the mandrel 34 (see FIG. 13). Thus, the T-shaped channel 38 having the deeper, narrow region 64 and the shallower, wide region 62 permits the extrusion 46 to block the narrow region 64 and create the internal cavity 50.

Upon completion of the block 66, a portion of the extrusion 46 may protrude from the outer surface 40 of the mandrel such that the original (e.g., trapezoidal) shape of the mandrel 34 is disrupted (see FIG. 13). In order to restore the original trapezoidal (or other) shape of the mandrel 34 as well as its molding capability, the extrusion 46 may be machined flush with the outer surface 40 of the mandrel 34 according to a next block 70 (see FIG. 14). However, the block 70 may be eliminated if the extrusion 46 is already sized to be flush with the outer surface 40 of the mandrel.

Figure 15:
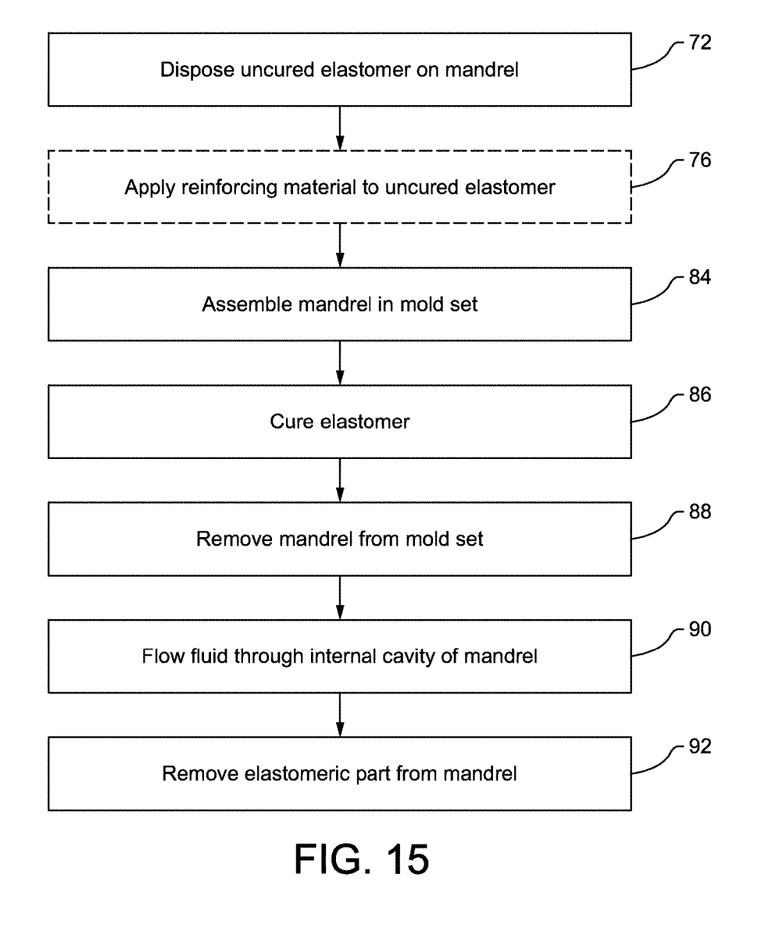
FIG. 15 is a flowchart illustrating a sample sequence of steps that may be involved in fabricating the elastomeric part using the mandrel, in accordance with a method of the present disclosure.
Figure 16:
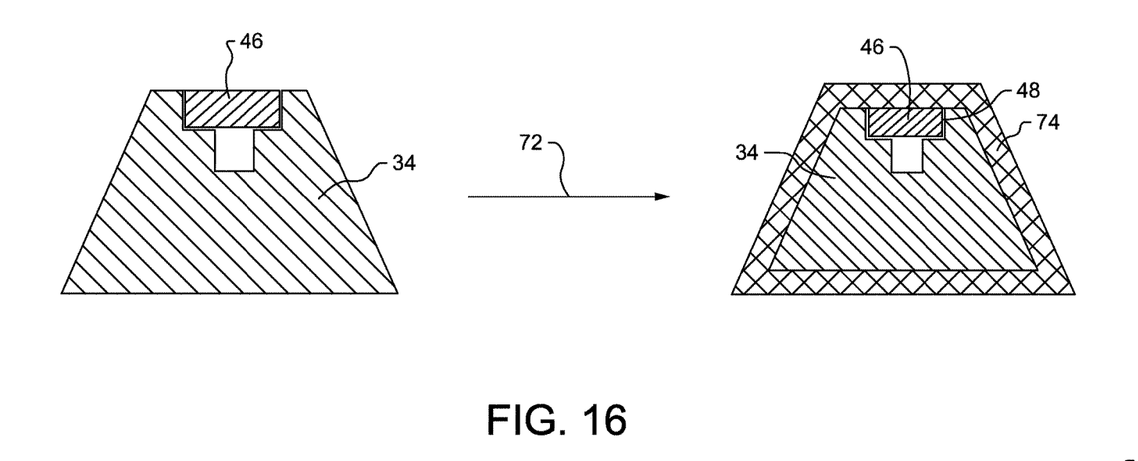
FIG. 16 is a cross-sectional view, schematically illustrating disposing an uncured elastomer on the mandrel, in accordance with the method of FIG. 15.

Turning now to FIGS. 15-19, a series of steps that may be involved in fabricating the elastomeric part 20 using the mandrel 34 are shown. Specifically, FIG. 15 shows a flowchart of steps that may be involved in fabricating the elastomeric part 20, and FIGS. 16-19 schematically illustrate some of the steps of FIG. 15. Beginning with a first block 72, one or more layers of uncured elastomer 74 may be disposed on the mandrel 34 (see FIG. 16). For example, the uncured elastomer 74 may be pulled from calendered sheets and subsequently wrapped or laid-up around the mandrel 34 to a desired thickness. However, other alternative methods of applying the uncured elastomer 74 to the mandrel, such as dipping the mandrel 34 in a dispersion of uncured elastomer, may also be used. As noted above, the interference fit 48 between the extrusion 46 and the mandrel 34 may be dimensioned to preclude the passage of any of the uncured elastomer 74 therethrough such that only the outer surface 40 of the mandrel (and the exposed outer surface of the extrusion 46) is involved in molding the shape of the elastomeric part 20.

One or more layers of reinforcement material may be integrated into the uncured elastomer 74 by applying the reinforcement material to the uncured elastomer 74 according to an optional block 76. For example, if the three-layer reinforced construction shown in FIG. 5 is desired, a first layer of uncured fluropolymer elastomer may first be disposed on the mandrel 34, followed by application of a fiberglass layer over the first layer of uncured fluoropolymer elastomer, followed by disposal of a second layer of uncured fluoropolymer elastomer on the fiberglass layer. The fiberglass layer may be provided in the form of a fabric sleeve that may be pulled over the first layer of uncured fluoropolymer elastomer. Other methods of applying a reinforcement material apparent to those with ordinary skill in the art may be used as well.

Figure 17:
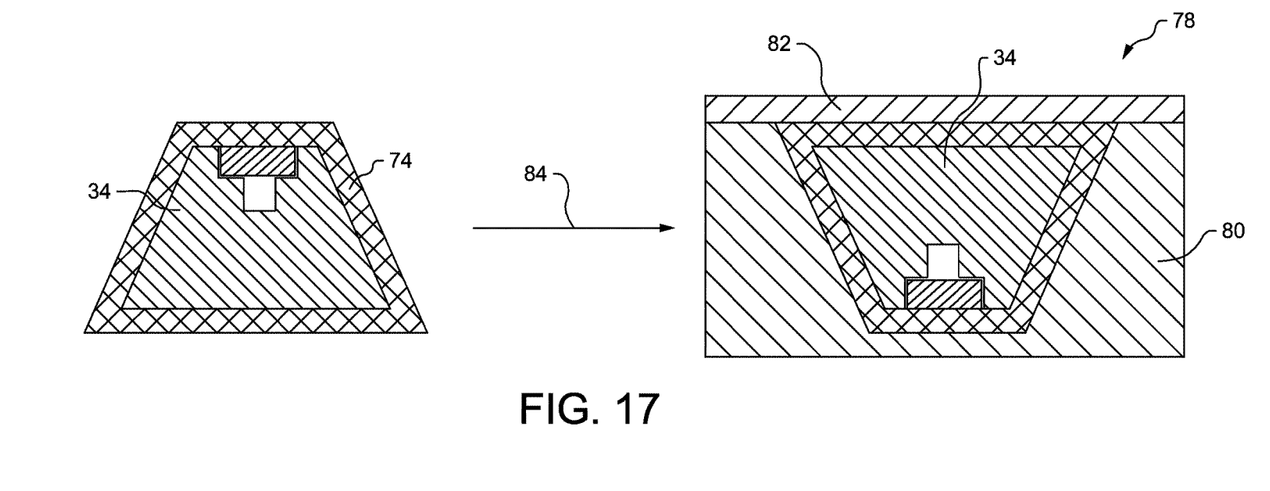
FIG. 17 is a cross-sectional view, schematically illustrating assembling the mandrel as a mold set, in accordance with the method of FIG. 15.
Figure 18:
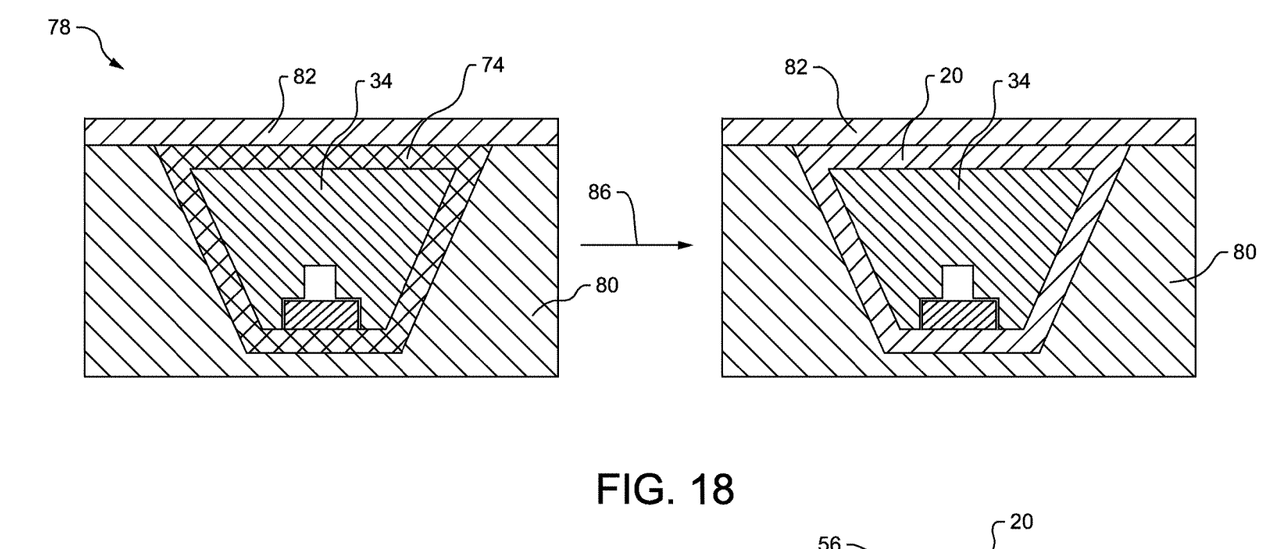
FIG. 18 is a cross-sectional view, schematically illustrating curing the elastomer in the mold set to provide the elastomeric part, in accordance with the method of FIG. 15.

Once the uncured elastomer 74 (and optional reinforcement material(s)) are disposed on the mandrel 34, the mandrel 34 carrying the uncured elastomer 74 may be assembled as a mold set 78 that includes the mandrel 34, a base 80, and a lid 82 according to next block 84 (see FIG. 17). The uncured elastomer 74 may then be cured according to a next block 86 (see FIG. 18) by placing the mold set 78 in a heated press as will be apparent to those with ordinary skill in the art. Specifically, the heated press may heat and pressurize the mold set 78 to cause the elastomer 74 to cure and provide the elastomeric part 20. The mandrel 34 carrying the elastomeric part 20 may then be removed from the mold set 78 (block 88).

Figure 19:
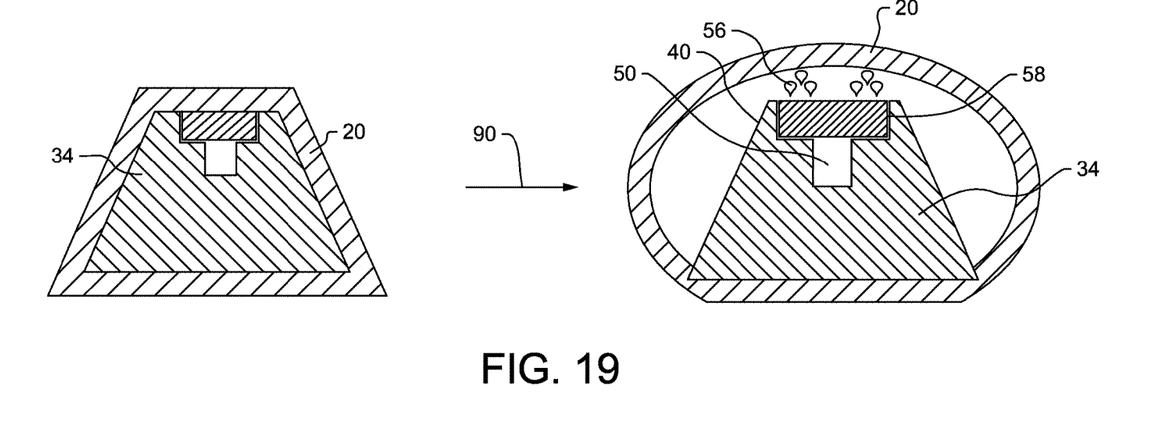
FIG. 19 is a cross-sectional view, schematically illustrating flowing a fluid through an internal cavity of the mandrel to facilitate release of the elastomeric part from the mandrel, in accordance with the method of FIG. 15.

When release of the elastomeric part 20 from the mandrel 34 is desired, the fluid 56 (e.g., soap water, etc.) may be pumped or otherwise introduced into the internal cavity 50 via the exposed end 55 of the cavity to facilitate release of the part 20 from the mandrel 34 (block 90 and FIG. 19). Namely, the fluid 56 may flow through the passage 58 and leak to the outer surface 40 of the mandrel to release frictional, constrictive, and/or vacuum forces between the elastomeric part 20 and the mandrel 34, thereby enabling the removal of the part 20 from the mandrel 34 (block 92). If inflated and/or stretched by the fluid 56, the elastomeric part 20 may deflate or otherwise return to its original molded shape upon removal from the mandrel 34.

INDUSTRIAL APPLICABILITY

In general, it can therefore be seen that the technology disclosed herein has industrial applicability in a variety of settings including, but not limited to, the manufacture of tube-like elongated, thin-walled, and reinforced elastomeric parts. The mandrel disclosed herein includes an internal cavity and an interference fit between an extrusion and the mandrel that is dimensioned to permit the flow of fluid (e.g., soap water, air, oil, etc.) from the internal cavity to the outer surface of the mandrel, and to obstruct the passage of more viscous materials, such as uncured elastomer. This property of the inference fit advantageously allows the use of fluid leakage through the interference fit to induce the release of an elastomeric part molded on the mandrel, without interfering with the molding capability of the mandrel. Applicants have shown that the interference fit permits fluid flow therethrough at relatively low pressures (~30 psi) such that the elastomeric part may be removed from the mandrel using fluid flow from a hose or a low pressure pump. Thus, the technology disclosed herein allows the removal of an elongated, thin-walled, and reinforced elastomeric part from a mandrel under mild conditions that retain the original structure of the part. For example, applicants have shown that the mandrel disclosed herein permits the release of elongated (>10 feet), thin-walled (~0.05 inches to ~0.20 inches), and fiberglass reinforced elastomeric parts used in aircraft fuselage bagging schemes, a result previously difficult to achieve without cutting the elastomeric part off of the mandrel. Even prior art strategies of applying a release agent, such as a soap coating, on the surface of the mandrel or water injection from a nozzle have not been suitably effective for facilitating removal of reinforced elastomeric tools of such dimensions from a mandrel. It is expected that the technology disclosed herein may find wide industrial applicability in a wide range of areas such as, but not limited to, aircraft and military applications.

What is claimed is:

1. A method of forming an elastomeric part, comprising: disposing an uncured elastomer on a mandrel, the mandrel including an elongated body having an outer surface and an internal cavity formed therein, the mandrel further including a channel formed in the outer surface and extending lengthwise along the outer surface, and an extrusion fit into the channel to provide an interference fit between the channel and the extrusion, the interference fit defining a passage providing fluid communication between the internal cavity and the outer surface of the body, the passage being dimensioned so as to permit a flow of a fluid from the internal cavity to the outer surface of the body;
curing the uncured elastomer disposed on the mandrel to provide the elastomeric part; and
flowing the fluid through the internal cavity to cause the fluid to flow out of the passage and intervene between the outer surface of the mandrel and the elastomeric part to facilitate release of the elastomeric part from the mandrel.

2. The method of claim 1, wherein the fluid is a solution of soap and water.

3. The method of claim 2, wherein the elastomeric part is at least about ten feet long, has a transverse height of between about one inch and about three inches, and a wall thickness of between about 0.05 and about 0.20 inches.

4. The method of claim 2, wherein the elastomeric part is formed from a fluoropolymer elastomer.

5. The method of claim 4, wherein the elastomeric part is reinforced with fiberglass.

6. The method of claim 1, wherein the method further comprises applying one or more layers of reinforcing material to the uncured elastomer prior to curing the uncured elastomer.

7. The method of claim 1, wherein
the channel includes a wide region and a narrow region that extends deeper into the mandrel than the wide region, wherein the extrusion is fit into the wide region, and wherein the narrow region defines the internal cavity when the extrusion is fit into the wide region of the channel.

8. The method of claim 7, wherein the extrusion is fit into the wide region using a thermal/press fit application.

9. A mandrel configured to facilitate release of an elastomeric part cured thereon, comprising:
an elongated body having an outer surface and an internal cavity formed therein;
a channel formed in the outer surface and extending lengthwise along the outer surface; and
an extrusion fit into the channel to provide an interference fit between the channel and the extrusion, the interference fit defining a passage providing fluid communication between the internal cavity and the outer surface of the body, the passage being dimensioned so as to permit a flow of a fluid from the internal cavity to the outer surface of the body, the flow of the fluid from the internal cavity to the outer surface causing the fluid to intervene between the outer surface of the mandrel and the elastomeric part to facilitate the release of the elastomeric part from the mandrel.

10. The mandrel of claim 9, wherein
the channel includes a wide region and a narrow region that extends deeper into the mandrel than the wide region, and wherein the extrusion is fit into the wide region.

11. The mandrel of claim 10, wherein the narrow region defines the internal cavity when the extrusion is fit into the wide region of the channel.

12. The mandrel of claim 11, wherein the mandrel includes a first end and a second end, and wherein the internal cavity extends lengthwise through the mandrel from the first end to the second end.

13. The mandrel of claim 12, wherein the elastomeric part includes an open end and a closed end covering the second end of the mandrel such that the internal cavity is exposed at the first end of the mandrel, and wherein the internal cavity is configured to release a vacuum between the closed end of the elastomeric part and the mandrel.

14. The mandrel of claim 11, wherein the mandrel and the extrusion have matching coefficients of thermal expansion.

15. The mandrel of claim 14, wherein the mandrel and the extrusion are both formed from an aluminum alloy.

16. The mandrel of claim 14, wherein the extrusion is fit into the wide region by a thermal/press fit application comprising:
heating the mandrel to cause thermal expansion of the wide region, while holding the extrusion at ambient temperature;
press-fitting the extrusion into the wide region; and
allowing the mandrel to cool so that the wide region thermally contracts and retains the extrusion.

17. The mandrel of claim 14, wherein the extrusion is machined flush with the outer surface of the mandrel.

18. A mandrel configured to facilitate the release of an elastomeric part cured thereon, comprising:
an elongated body having an outer surface;
a channel extending lengthwise along the outer surface of the elongated body and having a T-shape in cross-section, the channel including both a wide region and a narrow region extending deeper into the mandrel than the wide region; and
an extrusion fit into the wide region such that the narrow region defines an internal cavity extending lengthwise through the mandrel, the extrusion sealing the channel except to permit fluid flow between the internal cavity and the outer surface of the mandrel, the fluid flow from the internal cavity to the outer surface facilitating the release of the elastomeric part from the mandrel.

* * * * *